H. R. SCHROER.
GAME.
APPLICATION FILED MAY 16, 1916.
1,210,854.
Patented Jan. 2, 1917.
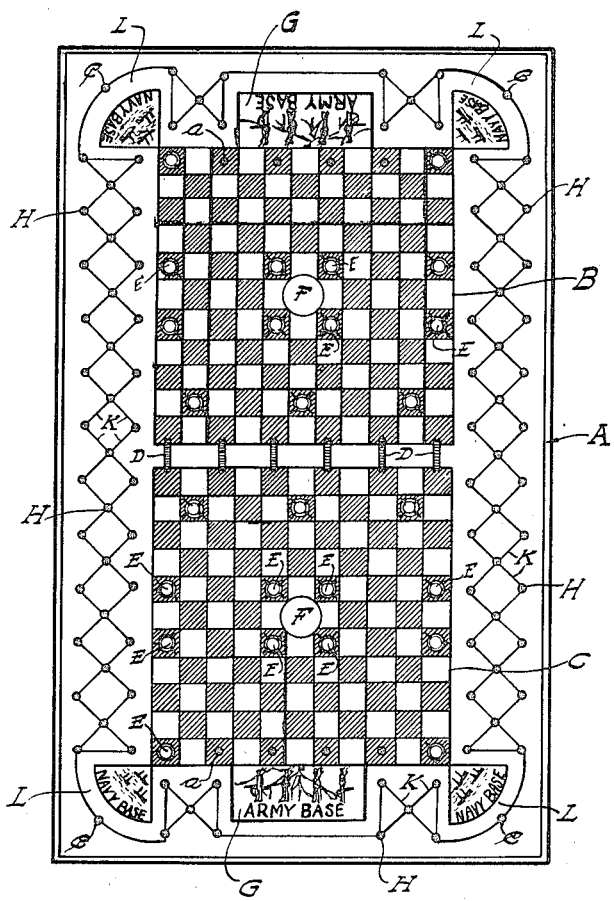
Fig. 1
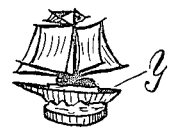
Fig. 2    Fig. 3
Inventor
Hans Raymond Schroer
by Frederick W. Cameron
Atty

UNITED STATES PATENT OFFICE.

HANS RAYMOND SCHROER, OF ALBANY, NEW YORK, ASSIGNOR TO WILLIAM C. MARTINEAU AND CLARENCE R. MARTINEAU, OF ALBANY, NEW YORK.

GAME.

1,210,854.  Specification of Letters Patent.  Patented Jan. 2, 1917.

Application filed May 16, 1916. Serial No. 97,798.

*To all whom it may concern:*

Be it known that I, HANS RAYMOND SCHROER, a citizen of the United States of America, residing at the city of Albany, in the county of Albany and State of New York, have invented certain new and useful Improvements in Games, of which the following is a specification.

My invention relates to games, and the object of my invention is to provide a game in the playing of which there are used a board and separate individual playing pieces, which may be moved on the board in accordance with the rules governing the game; together with such other elements and combinations as are hereinafter more particularly set forth and claimed.

I accomplish these objects as shown in the accompanying drawing, in which:

Figure 1 represents the board. Fig. 2 represents one of the individual playing pieces. Fig. 3 is a representation of another playing piece.

Similar letters refer to similar parts throughout the several views.

The game board, A, is preferably of oblong formation and has painted on its face two like checkered sections, B, C, arranged like an ordinary checker board, *i. e.*, each of the sections, B, C, is a parallelogram, and each is divided into an equal number of squared portions, but not necessarily the number of parts the ordinary checker board is divided into. Every other one of these squares is colored dark and they are arranged so that the dark colors meet each other diagonally, as is the case in checker boards. The like sections, B, C, are connected by the bridges, D, uniting the adjacent darkened squares. At suitable predetermined positions on each of the sections, B, C, I place the representation of a fort, E, and in about the central portion of each section, I place a fortress, F, which is protected by four forts, E. At the end of each section is placed what I term the "army base" G, where are retained the playing pieces when not in use in the game. Around the edges and ends of the board, I place a series of large dots, H, H, connected by the lines, K, and at the four corners of the board and joining diagonally the extreme corners of each section, B, C, I arrange the space, L, L, which I call the "navy base," which is for the retention of the playing pieces which are used along the lines and dots around the sides and ends of the board, A.

For playing on the dark squares of the sections, B, C, I use preferably a man, X, which represents a soldier, to represent the army, as shown in Fig. 2; and for use on the edges of the board along the lines, K, and dots, H, I use a miniature ship, Y, to represent the navy, as shown in Fig. 3. I usually have forty-eight playing pieces representing soldiers, and twelve playing pieces representing battleships. The soldiers are of two colors. Half of the playing pieces are of one color and the other half of another color. Likewise the battleships are half of one color and half of another color. Each player assembles his soldiers, the pieces of one color, and his battleships which are the ships of the corresponding color. Each then moves four of his soldiers into the field by placing them on the dotted positions in the first row, as shown at *a, a*, and each starts a ship onto the large dot position, *c*, on the outer lines of the naval bases. The army and navy operate jointly—one or the other is played as desired. The playing commences, the movement being exactly as in checkers, one move at a time, the players taking turns alternately. The soldiers are always placed on the darker squares and are moved diagonally. Captures are effected by leaping over the enemy diagonally into the vacant square beyond; and the captured troop, or troops, on a fort, E, are removed from the board. The same principle applies in the battle of the ships. The battleships must always follow the lines, K, and the dots, H. Moving a reserve troop or a reserve ship from a base to action constitutes one play. Crossing a bridge and entering the opponent's country gives a double which is like a king in checkers, and doubles, like kings in checkers, may be moved in any direction. The capture of a coast fort by a battleship gives a double. A ship can only take a fort when directly opposite it, but cannot take it if there is a double of the enemy on the fort. The object of the navy is to capture the ships of the enemy, which they do by jumping them as in the case of the soldiers. The battle is won when one force has captured the fortress, F, and the four small forts, E, E, protecting it, or when the enemy's troops have all been taken, or so blocked that they can make no further move. I do not limit myself to this precise way of marking and laying out the game board, nor to the particular way of playing the game.

What I claim as my invention and desire to secure by Letters Patent is:

1. A game comprising a board laid out in the form of two like sections slightly separated, each section resembling in appearance a checker board; connecting lines between the two sections; a series of dots connected by lines extending around the combined checker sections; a series of playing pieces representing soldiers for use on the checkered sections; and a series of playing pieces representing battleships for use on the dots and lines.

2. In a game adapted to represent army and navy maneuvers, two like but separately spaced checkered sections illustrated on the game board; connections between the said sections illustrated thereon; playing pieces representing soldiers for use on the sections; a series of representations of forts on each section; a representation of a fortress with protecting forts connecting on each section; dots and lines arranged around the combined sections to represent the places for the movement of the battleships; and a series of playing pieces representing battleships to be moved along the lines occupying the positions indicated by the dots around the edges of the sections.

3. A game adapted to represent both naval and army battles, comprising a game board having depicted thereon two territories divided into suitable squares; the two territories connected by representations of bridges; a representation of water placed around the two territories with an indicated direction of the permitted movement of playing pieces representing ships on said portion representing water; a series of playing pieces representing soldiers of one color for one player and a series of playing pieces representing soldiers of a different color for the other player; a series of playing pieces representing battleships of one color for one player and a like series of battleships of a different color from the first series for the other player.

In testimony whereof I have affixed my signature in presence of two witnesses.

HANS RAYMOND SCHROER.

Witnesses:
 BEULAH CARLE,
 FREDERICK W. CAMERON.